United States Patent Office 3,842,120
Patented Oct. 15, 1974

3,842,120
**2-METHYL - 2-[p-(N-PHENYLFORMIMIDOYL)
PHENOXY]PROPIONIC ACID ESTERS AND
CONGENERS**
William K. Sprenger, Des Plaines, Ill., assignor to
G. D. Searle & Co., Chicago, Ill.
No Drawing. Filed Apr. 2, 1973, Ser. No. 347,143
Int. Cl. C07c *101/44*
U.S. Cl. 260—471 R          10 Claims

ABSTRACT OF THE DISCLOSURE

Preparation and the valuable biological properties —including antifungal, antibacterial, and antiprotozoal activity—of 2-methyl-2-[p - (N-phenylformimidoyl)phenoxy] propionic acid esters and congeners are disclosed.

This invention relates to 2-methyl - 2 - [p-(N-phenylformimidoyl)phenoxy]propionic acid esters and congeners and to processes for the preparation thereof. More particularly, this invention provides new, useful, and unobvious chemical compounds of the formula

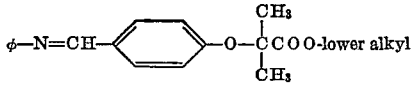

wherein $\phi$ represents phenyl optionally substituted by 1 or more halogens, hydroxys, and/or lower alkoxys. The positioning of these substituents relative to the point of attachment of the phenyl nucleus to nitrogen and, where a plurality of substituents is present, to each other is not critical.

By "lower alkyl" in the foregoing formula is meant methyl, ethyl, propyl, isopropyl, butyl, isobutyl, sec.-butyl, tert.-butyl, pentyl, neopentyl, hexyl, isohexyl, heptyl, or like monovalent, saturated, acyclic, straight- or branched-chain, hydrocarbon groupings of empirical formula $$-C_nH_{2n+1}$$

wherein $n$ represents a positive integer less than 8.

The halogens contemplated are fluorine, chlorine, bromine, and iodine, among which the last three are preferred.

"Lower alkoxy" as used herein designates a radical of the formula

—O-lower alkyl wherein lower alkyl is defined as before.

Although as many as 5 substituents, alike or different, can be present on the phenyl nucleus represented by $\phi$, a single halogen or hydroxy or fewer than 4 lower alkoxys is preferred.

The compounds to which this invention relates are useful by reason of their valuable biological properties. In particular, they are antifungal agents. They are also antibacterial and antiprotozoal.

The antifungal utility of the instant compounds is evident from the results of a standardized test for their capacity to inhibit the growth of *Trichophyton mentagrophytes* described in U.S. 3,679,697. The products of Examples 2B, 3, 5, 7, and 9 hereinafter were found to be active at concentrations of 1000 mcgm./ml. in this test.

The antibacterial and antiprotozoal utility of the instant compounds is evident from the results of standardized tests for their capacity to inhibit the growth of *Erwinia sp.* and *Tetrahymena pyriformis* described in the aforesaid patent. The products of Examples 2B, 5, and 9 hereinafter were found to be active at concentrations of 1000 mcgm./ml. in these tests.

Those skilled in the art will recognize that observations of activity in standardized tests for particular biological effects are fundamental to the development of valuable new drugs, both veterinary and human.

Preparation of the compounds of this invention proceeds by heating p-hydroxybenzaldehyde with a 2-bromo-2-methylpropionic acid lower alkyl ester in the presence of potassium carbonate, using dimethylsulfoxide as a solvent, and contacting the resultant 2-(p-formylphenoxy)-2-methylpropionic acid lower alkyl ester with an amine of the formula

wherein $\phi$ is defined as above.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

EXAMPLE 1

(A) Methyl 2-(p-formylphenoxy)-2-methylpropionate

To a solution of approximately 61 parts of p-hydroxybenzaldehyde and 76 parts of anhydrous potassium carbonate in 220 parts of dimethylsulfoxide is added, with stirring, approximately 100 parts of methyl 2-bromo-2-methylpropionate. The resultant mixture is stirred at 90–100° for 24 hours, whereupon volatile materials are removed by distillation at 90–100°/10 mm. The residue is mixed with 800 parts of cold water, and this mixture is extracted with ether. The ether extract is consecutively washed with aqueous 5% potassium carbonate, aqueous 1% potassium carbonate, and water, then dried over anhydrous sodium sulfate. Solvent is thereupon stripped by vacuum distillation. The residue is methyl 2-(p-formylphenoxy)-2-methylpropionate, which can be further purified by vacuum distillation.

(B) Methyl 2-methyl-2-[p-(N-phenylformimidoyl)-phenoxy]propionate

A mixture of 28 parts of methyl 2-(p-formylphenoxy)-2-methylpropionate and 12 parts of freshly-distilled analine is stirred at room temperatures for 4 hours, then taken up in 350 parts of ether. The ether solution was washed with water, dried over magnesium sulfate, and stripped of solvent by vacuum distillation. The residue is methyl 2 - methyl-2-[p-(N-phenylformimidoyl)phenoxy] propionate, having the formula

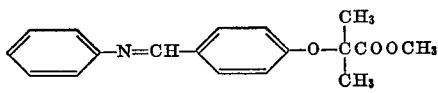

EXAMPLE 2

(A) Ethyl 2-(p-formylphenoxy)-2-methylpropionate

Substitution of approximately 108 parts of ethyl 2-bromo-2-methylpropionate for the methyl 2-bromo-2-methylpropionate called for in Example 1A affords, by the procedure there detailed, ethyl 2-(p-formylphenoxy)-2-methylpropionate which, distilled at 128–132°/0.1 mm., is obtained as a colorless liquid characterized by an index of refraction amounting to 1.5242 at 25°.

(B) Ethyl 2-methyl-2-[p-(N-phenylformimidoyl)-phenoxy]propionate

A mixture of 30 parts of ethyl 2-(p-formylphenoxy)-2-methylpropionate and 12 parts of freshly-distilled analine is stirred at room temperatures for 4 hours, then taken up in 350 parts of ether. The ether solution is washed with water, dried over magnesium sulfate, and stripped of solvent by vacuum distillation. The residue, distilled at 190–193°/0.2 mm., affords ethyl 2-methyl-2-[p-(N-phenylformimidoyl)phenoxy]propionate having an index of refraction of 1.5915 at 30°.

EXAMPLE 3

Ethyl 2-{p-[N-(p-chlorophenyl)formimidoyl]phenoxy} 2-methylpropionate

A mixture of 40 parts of ethyl 2-(p-formylphenoxy)-2-methylpropionate and 22 parts of p-chloroanaline is stirred at room temperatures for 3 hours, whereupon 240 parts of ethanol is introduced and the resultant mixture is warmed gently while sufficient water is added to induce faint turbidity. The mixture thus obtained is chilled. A crystalline precipitate forms which, filtered off, dried in air, and recrystallized from a mixture of ethanol and water, affords ethyl 2-{p-[N-(p-chlorophenyl)formimidoyl]phenoxy}-2-methylpropionate as faintly yellow prisms melting at approximately 56–57°.

EXAMPLE 4

Ethyl 2-{p-[N-(m-iodophenyl)formimidoyl]phenoxy}-2-methylpropionate

Substitution of approximately 38 parts of m-iodoanaline for the p-chloroanline called for in Example 3 affords, by the procedure there detailed, ethyl 2-{p-[N-(m-iodophenyl)formimidoyl]phenoxy}-2-methylpropionate.

EXAMPLE 5

Ethyl 2-{p-[N-(p-hydroxyphenyl)formimidoyl]phenoxy}-2-methylpropionate

A mixture of 33 parts of p-aminophenol and 70 parts of ethyl 2-(p-formylphenoxy) - 2 - methylpropionate is stirred at room temperatures for 1 hour, 800 parts of ethanol being introduced after the first few minutes to maintain liquidity. The resultant mixture is heated sufficiently to induce solution, whereupon water is added q.s. faint turbidity. The turbid mixture is treated with decolorizing charcoal and then chilled. The crystalline precipitate which forms is ethyl 2-{p-[N-p-hydroxyphenyl)-formimidoyl]phenoxy}-2-methylpropionate. Filtered off and dried in air, it melts at approximately 150–151°.

EXAMPLE 6

Ethyl 2-{p-[N-(m-hydroxyphenyl)formimidoyl] phenoxy}-2-methylpropionate

Substitution of 33 parts of m-aminophenol for the p-aminophenol called for in Example 5 affords, by the procedure there detailed, ethyl 2-{p-[N-m-hydroxyphenyl)-formimidoyl]phenoxy}-2-methylpropionate.

EXAMPLE 7

Ethyl 2-{p-[N-(p-methoxyphenyl)formimidoyl] phenoxy}-2-methylpropionate

A mixture of 37 parts of p-methoxy-analine and 70 parts of ethyl 2-(p-formylphenoxy)-2-methyl-propionate is stirred at room temperatures for 6 hours, then taken up in 700 parts of ether. The ether solution is washed with water, dried over magnesium sulfate, treated with decolorizing charcoal, and stripped of solvent by vacuum distillation. The residue is ethyl 2-{p-[N-(p-methoxyphenyl)formimidoyl]phenoxy}-2-methylpropionate having an index of refraction amounting to 1.5952 at 28°.

EXAMPLE 8

Ethyl 2-{p-[N-(o-ethoxyphenyl)formimidoyl]phenoxy}-2-methylpropionate

Substitution of approximately 43 parts of o-ethoxy-analine for the p-methoxyanaline called for in Example 7 affords, by the procedure there detailed, ethyl 2-{p-[N-(o-ethoxyphenyl)formimidoyl]phenoxy}-2-methylpropionate

EXAMPLE 9

Ethyl 2-{p-[N-(3,4,5-trimethoxyphenyl)formimidoyl]=phenoxy}-2-methylpropionate

A mixture of 47 parts of 3,4,5-trimethoxyanaline and 60 parts of ethyl 2-(p-formylphenoxy)-2-methylpropionate is stirred at room temperatures for 3 hours, then taken up in 700 parts of ether. The ether solution is washed with water, dried over magnesium sulfate, treated with decolorizing charcoal, and stripped of solvent by vacuum distillation. The residue, a light yellow oil, is ethyl 2-{p-[N-(3,4,5 - trimethoxyphenyl) - formimidoyl]phenoxy} - 2-methylpropionate characterized by an index of refraction amounting to 1.5801 at 28°.

What is claimed is:
1. A compound of the formula

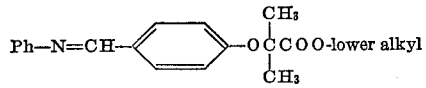

wherein Ph represents phenyl optionally substituted by halogen of atomic number greater than 9 and less than 33, hydroxyl, or fewer than 4 lower alkoxys.

2. A compound according to Claim 1 having the formula

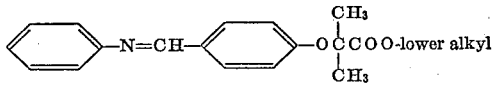

3. A compound according to Claim 1 which is ethyl 2 - methyl - 2 - [p - (N - phenylformimidoyl)phenoxy] propionate.

4. A compound according to Claim 1 having the formula

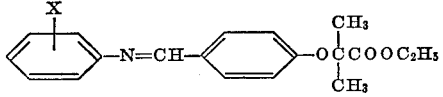

wherein X represents halogen of atomic number greater than 9 and less than 33.

5. A compound according to Claim 1 which is ethyl 2 - {p - [N - (p - chlorophenyl)formimidoyl]phenoxy}-2-methylpropionate.

6. A compound according to Claim 1 having the formula

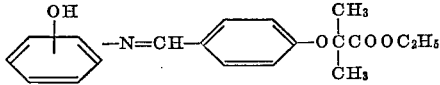

7. A compound according to Claim 1 which is ethyl 2 - {p - [N - (p - hydroxyphenyl)formimidoyl]phenoxy} 2-methylpropionate.

8. A compound according to Claim 1 having the formula

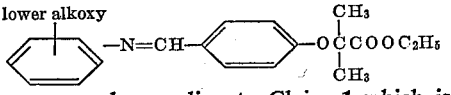

9. A compound according to Claim 1 which is ethyl 2 - {p - [N - (p - methoxyphenyl)formimidoyl]phenoxy}-2-methylpropionate.

10. A compound according to Claim 1 which is ethyl 2 - {p - [N - (3,4,5 - trimethoxyphenyl)formimidoyl] phenoxy}-2-methylpropionate.

References Cited

UNITED STATES PATENTS 3,718,688   2/1973   Davis _____ 260—471 R

LORRAINE A. WEINBERGER, Primary Examiner

L. A. THAXTON, Assistant Examiner

U.S. Cl. X.R.

424—309